United States Patent [19]

Hsiao

[11] 4,035,799
[45] July 12, 1977

[54] DIGITAL MEAN CLUTTER DOPPLER COMPENSATION SYSTEM

[75] Inventor: James K. Hsiao, Oxon Hill, Md.

[73] Assignee: The United States of America as represented by the Secretary of the Navy, Washington, D.C.

[21] Appl. No.: 628,631

[22] Filed: Nov. 4, 1975

[51] Int. Cl.² .......................................... G01S 9/42
[52] U.S. Cl. ............................................... 343/7.7
[58] Field of Search ...................................... 343/7.7

[56] References Cited

U.S. PATENT DOCUMENTS

| | | | |
|---|---|---|---|
| 3,775,768 | 11/1973 | Lisle et al. | 343/7.7 |
| 3,797,016 | 3/1974 | Martin | 343/7.7 |
| 3,962,704 | 6/1976 | Evans | 343/7.7 |

Primary Examiner—T.H. Tubbesing
Attorney, Agent, or Firm—R. S. Sciascia; Philip Schneider; George A. Montanye

[57] ABSTRACT

A digital technique is disclosed for filtering clutter in a pulse doppler MTI radar which allows a filter notch to be set for different doppler frequencies. In particular, the system includes two or more MTI filters cascaded to cancel different kinds of clutter signals that interfere with target signal reception. In each filter a digital detection circuit senses the mean-clutter-doppler frequency for a particular clutter type and automatically places a notch at that frequency. Each notch is fixed by treating the radar samples as complex numbers and replacing the conventional filter coefficients with complex coefficients indicating amplitude and phase as derived from the radar returns.

10 Claims, 2 Drawing Figures

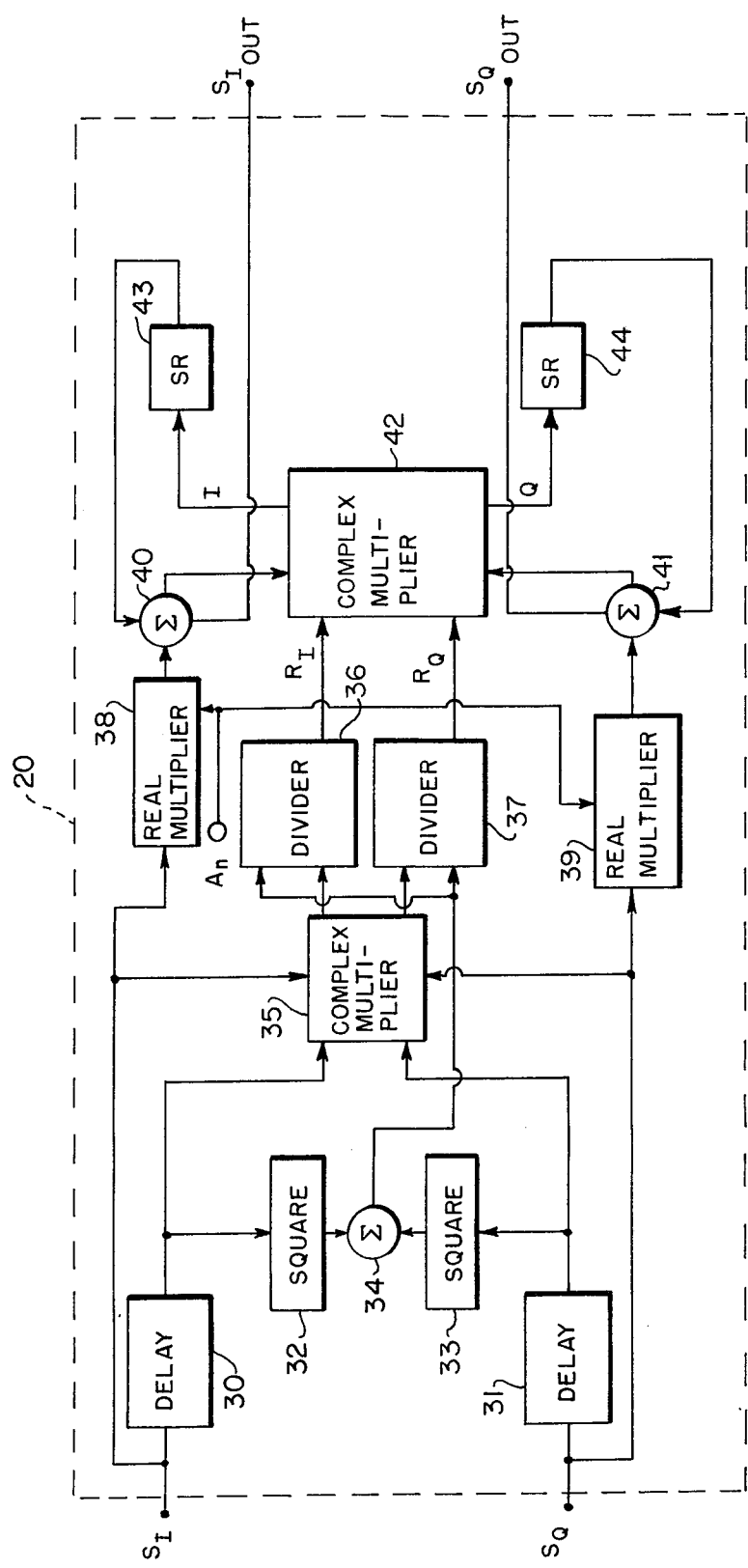

DIGITAL MEAN CLUTTER DOPPLER COMPENSATION SYSTEM

BACKGROUND OF THE INVENTION

The present invention relates to MTI radar systems and more particularly to new and improved techniques for rejecting multiple clutter types in an MTI radar.

Generally, MTI radar systems distinguish between targets and clutter on the basis of the doppler frequency shift imparted by a moving object. In designing conventional MTI radar systems it was usually assumed that clutter was stationary thereby providing a zero doppler shift. Moving targets could then be distinguished by placing a filter notch at the point where the radar return had zero doppler to cancel any echo from the clutter. While such systems worked well when the clutter was in fact stationary, problems arose when moving clutter existed in the viewing area. More particularly, such factors as radar platform movement and environmental effects (e.g. wind or rain) caused the clutter to become non-stationary and imparted to doppler shift to the radar returns which prevented the conventional MTI systems from effectively cancelling the clutter.

In order to compensate for the incomplete cancellation initiated by the clutter movement, various systems have been proposed which attempt to distinguish a clutter doppler from a target doppler. One such system known as the Time-Average-Clutter Coherent Airborne Radar (TACCAR), as described in the "Radar Handbook" by M. I. Skolnik, McGraw Hill, 1970 chapters 17 and 18, uses a feedback loop to compensate for clutter movement. In this particular system a filter notch is provided at a velocity corresponding to the mean-clutter-doppler by an analog loop which senses any change in the mean-clutter-doppler and shifts the doppler frequency to maintain the filter notch for clutter cancellation. In this manner, the movement imparted to clutter due to external conditions could be continuously compensated to prevent interference with moving target detection.

While the above TACCAR technique has been relatively successful in cancelling moving clutter, many present day radars are implemented digitally and are not compatible with the analog TACCAR technique. In addition, the TACCAR technique is inherently limited to cancelling only one particular clutter type since the IF mixer can only provide a filter notch at one frequency at a time. Since radar returns may contain a variety of clutter types simultaneously, each hving different mean doppler frequencies, it can thus be seen that the TACCAR technique is severly restricted in multiple clutter environments. In long range surveillance radar systems, for example, a major problem is introduced by the simultaneous occurrence of land and weather clutter (or chaff) in the radar returns. These two types of clutter each have an entirely different mean-clutter-doppler frequency. The land clutter usually has a strong and narrow doppler spectrum at zero doppler, and the weather clutter a weaker but wider doppler spectrum at a high mean-clutter-doppler frequency. To effectively cancel the clutter, therefore, filter notches must be placed at each mean-clutter-doppler frequency, a requirement that cannot be implemented with the conventional TACCAR systems.

Accordingly, the present invention has been developed to overcome the specific shortcomings of the above known and similar techniques and to provide a new technique for allowing improved clutter cancellation in digital radars.

SUMMARY OF THE INVENTION

It is therefore an object of the present invention to provide an MTI that is less complex yet highly reliable in operation.

Another object of the invention is to provide a digital MTI radar system that can operate in a multiple clutter environment.

A further object of the invention is to provide digital filter circuitry for MTI radar systems that is capable of providing filter notches at a plurality of different frequencies.

Still another object of the invention is to provide a digital filter circuit that uses complex coefficients to set the notch frequencies.

Yet another object of the invention is to provide an improved digital filtering technique that allows real time cancelling of plural clutter types in an MTI system.

In order to accomplish these and other objects, the present invention utilizes digital signals representing the in-phase and quadrature phase components of the radar returns to derive a complex filter coefficient for each stage of a multiple stage MTI. The amplitude part of the complex coefficient is derived in the same manner as in conventional MTI's while the phase part is derived with a novel circuit which measures the phase as a function of the mean-clutter-doppler and adapts itself to changes in the clutter environment. The real and phase parts of the complex coefficients are then combined with a complex multiplier to fix the filter notch at the appropriate doppler frequency. A unique shift-register summing circuit is then utilized to combine the plurality of samples used to cancel the clutter at the particular doppler frequency before the output is provided to the next filter stage. By using the complex coefficients each digital filter can separately adjust the mean-clutter-doppler as the environment varies to effectively cancel a selected clutter. In addition, by using the shift-register summing-circuitry, multiple delay networks are not required thereby providing a less complex cancelling system.

Other objects, advantages, and novel features of the invention will become apparent from the following detailed description of the invention when considered with the accompanying drawings wherein:

BRIEF DESCRIPTION OF THE DRAWINGS

FIG. 2 is a schematic diagram showing the particular filter construction in the system of FIG. 1.

DETAILED DESCRIPTION OF A PREFERRED EMBODIMENT

Figure 1:
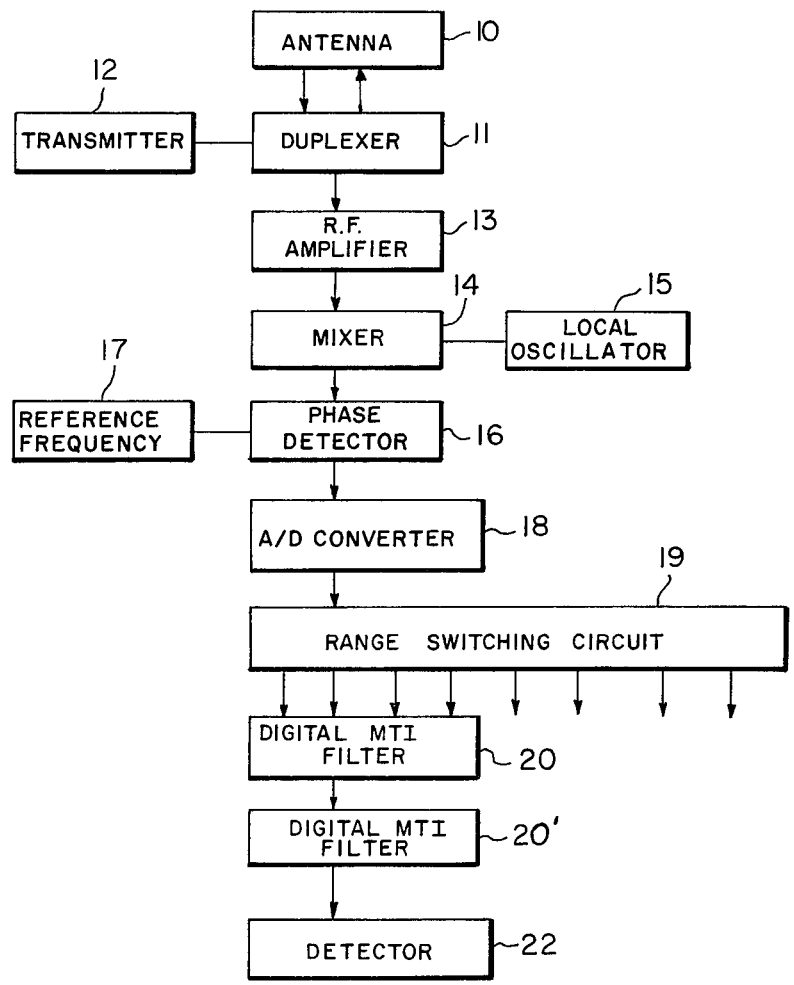
FIG. 1 is a schematic diagram of a digital MTI system utilizing cascaded filters according to the present invention.

Turning now to FIG. 1, a radar system is illustrated employing the digital filtering techniques according to the present invention. Generally there is shown a radar antenna 10 for radiating and receiving electromagnetic energy in the form of a series of pulse radar signals transmitted from transmitter 12 through a conventional duplexer 11. The radiated radar signals are reflected by objects to produce echo signals received as radar returns through duplexer 11 from the antenna 10. The received radar returns are coupled from duplexer 11 to RF amplifier 13 and then to mixer 14 where the radio frequency (RF) echo signals are combined with a reference signal from local oscillator 15 to produce intermediate frequency (IF) echo signals. The IF signals from 14 are then coupled to phase detector 16 where they are combined with a reference frequency signal from 17 before being converted to digital form by the analog to digital (A/D) converter 18. The digital signals are then applied to a range switching circuit 19 which operates to sample the echo signals at predetermined time intervals after the radar pulse has been transmitted from antenna 10. As is known, the time required for the radar pulse to travel to a target and back fixes the distance to the target. Such distance is determined in circuit 19 by sampling the echo signal at different times corresponding to specific target ranges.

The system as described up to this point represents a conventional digital radar as can be seen with reference to FIGS. 1 and 2 of U.S. Pat. No. 3,797,016. Unlike conventional digital systems, however, the present invention uses digital filters 20, 20' to allow cascading of the MTI filters as shown in FIG. 1. The filters, as more specifically shown in FIG. 2, each include a digital compensating circuit which senses the mean-clutter-doppler frequency of a particular clutter type and automatically places a notch at that frequency. The filter outputs are then coupled to a conventional detector 22 for determining the presence or absence of a target after the clutter has been cancelled.

In understanding the present invention reference will now be particularly made to FIG. 2 along with a brief description and comparison to prior known digital and analog MTI systems. Consider for example, a conventional coherent-pulse radar transmitting a train of N pulses with a fixed interpulse time period of T. The return from one range resolution cell can be represented as $$S_n = S_o \, e^{j2\pi f nT + \phi} \quad (1)$$

where $f$ is the target doppler frequency, $\phi$ the phase, $S_o$ the amplitude of the return signal, and $n$ the subscript for the $n^{th}$ return. Suppose now that the N returns are weighted and summed, then the final output can be represented as $$S(f) = S_o \, e^{j\phi} \sum_{n=0}^{N-1} C_n e^{j2\pi nfT} \quad (2)$$

wherein $C_n$ is the weight applied for each return. In a conventional MTI system exampled by FIG. 2 of the U.S. Pat. No. 3,797,016, the $C_n$'s are taken to be real such that $C_n = A_n$ and equation 2 reads as $$S(f) = S_o \, e^{j\phi} \left[ \sum_{n=0}^{N-1} A_n \cos 2\pi \, nfT + j \sum_{n=0}^{N-1} A_n \sin 2\pi \, nfT \right] \quad (3)$$

In the equation the first summation term (cosine term) represents the output of the $I$ (in-phase) channel while the second summation tern (sine term represents the $Q$ (quadrature phase) channel, and is implemented in an MTI system as two identical channels of the type shown in FIG. 2 of U.S. Pat. No. 3,797,016 as previously referred to. In order to detect a target, only the amplitude of the MTI output is used to give $$|S(f)|^2 = |S_o|^2 \sum_{n=0}^{N-1} \sum_{m=0}^{N-1} A_n A_m \cos 2\pi f(n-m)T \quad (4)$$

For stationary clutter, therefore, the coefficients $A_n$, $A_m$ are set so that the output is minimum at $f=0$, which is accomplished in some MTI systems, for example, by setting the $A_n$'s, $A_m$'s according to the binomial coefficients.

While the above technique provides clutter cancellation for stationary clutter with a mean-clutter-doppler of zero, the mean-clutter-doppler is not necessarily zero in practical air search radar systems where clutter varies with environmental changes and radar platform movement. As has been previously mentioned, such fluctuations were previously compensated by using an analog TACCAR system where the mean-clutter-doppler frequency $f_o$ is detected using a phase detector. The detector frequency is then added to the system coho which in turn is mixed with the IF to shift the doppler frequency $f$ by an amount $f_o$. An analysis of equation 4 under these conditions gives the resulting equation $$|S(f)|^2 = |S_o|^2 \sum_{n=0}^{N-1} \sum_{m=0}^{N-1} A_n A_m \cos 2\pi (n-m)T(f-f_o) \quad (5)$$

As can be seen, if the $A_n$'s and $A_m$'s remain the same as previously described, then the filter notch will occur at $f=f_o$ instead of at $f=0$. Thus, with a properly chosen $f_o$, any fluctuation of the mean-clutter-doppler could be compensated as environmental conditions changed. While the TACCAR system is therefore capable of providing an adjustable filter notch for certain types of clutter, the same system has severe deficiencies under certain environmental conditions. For one, the TACCAR system is essentially an analog device which is not readily compatible with digital information in modern digital MTI systems. Secondly, if two different types of clutter exist simultaneously in a radar resolution cell, and each has a different mean-clutter-doppler, the TACCAR system can only provide for the cancellation of one of the clutter types.

According to the present invention, a digital filter and MTI system has been developed which allows a frequency shift similar to the TACCAR system to be realized while allowing plural filters to be cascaded for cancelling multiple clutter types occuring simultaneously in the radar returns. Each filter is capable of cancelling a particular clutter type with independent adjustment of the notch position as the mean-clutter-doppler varies. In understanding the structure of the filter, it is first assumed that the mean-clutter-doppler frequency is again represented as $f_o$. Then, referring to equation 2, $C_n$ is defined as $$C_n = A_n \, e^{-j2\pi nf_o T} \quad (6)$$

and equation 2 becomes $$S(f) = S_o \, e^{j\phi} \sum_{n=0}^{N-1} A_n e^{j2\pi nT(f-f_o)} \quad (7)$$

It can be seen from equation 7 that if the weight $A_n$ of a conventional MTI is replaced by the complex number $C_n$, the same frequency shift can be attained as in conventional TACCAR system, but entirely with digital circuitry.

The complex filter coefficients of equation 6 consist of two parts, the amplitude part $A_n$ and phase part $e^{-j2\pi\, nf_oT}$. The amplitude part is the same as that used in conventional MTI systems and is fixed according to known techniques of filter design, while the phase part is a function of the mean-clutter-doppler which varies as the environment changes. The phase part must therefore be digitally measured from the radar returns so that the MTI filter can adapt itself to changes in the environment in a manner similar to the phase lock loop of the conventional TACCAR system.

In order to implement the digital phase detection, consider two successive radar returns $S_m$ and $S_n$ from the same resolution cell satisfying the relation $$S_m S_n^* = |S_o|^2 e^{j2\pi\, f_o (m-n)T} \qquad (8)$$

where $f_o$ is the mean-clutter-doppler and $S_n^*$ the conjugate of the $n^{th}$ radar return. If one sets $m-n = 1$ and normalizes the above expression by the amplitude of one of the radar returns, a quantity R can be defined whereby $$R = \frac{S_m S_n^*}{|S_n|^2} e^{j2\pi\, f_o T},\ m-n=1 \qquad (9)$$

It can be seen here that R is then essentially the phase delay of two consecutive pulses. Thus, by equation 6

$$C_n = A_n(R^*)^n \qquad (10)$$

where $(R^*)^n$ is the conjugate of R at the $n^{th}$ return. In terms of the I and Q channels of a radar return, R becomes $$R_I = \frac{S_2{}^I \cdot S_1{}^I + S_2{}^Q \cdot S_1{}^Q}{S_1{}^I \cdot S_1{}^I + S_1{}^Q \cdot S_1{}^Q} \qquad (11)$$

$$R_Q = \frac{S_1{}^I \cdot S_2{}^Q - S_1{}^Q \cdot S_2{}^I}{S_1{}^I \cdot S_1{}^I + S_1{}^Q \cdot S_1{}^Q} \qquad (12)$$

where $S^I$ and $S^Q$ are, respectively, the I and Q channel radar returns and the subscripts 1 and 2 represent the first and second of two consecutive radar returns. From the above it can be seen that by detecting the values for R, the mean-clutter-doppler notch can be set and automatically adjusted in response to changing conditions of the environment.

The filter is implemented as shown in FIG. 2 where the digital radar returns from the range switching circuit 19 are represented as digital inputs $S_I$ and $S_Q$ which, in turn, represent the in-phase and quadrature phase components of the radar return. While not shown in the drawing, a conventional quadrature hybrid circuit would be used to split the radar return into its I and Q components prior to A/D conversion at 18. The circuit up to this point, including range switching circuit 19, is the input means for providing both the I and Q components in digital form to filter 20. As is shown, the $S_I$ and $S_Q$ digital signals are coupled to elements 30–37 which form a detection means for detecting and adjusting the value of R as a function of the mean-clutter-doppler. The $S_I$ and $S_Q$ signals are coupled to delays 30 and 31 and as input to complex multiplier 35. The output from delays 30 and 31 are in turn coupled to squaring circuits 32 and 33 respectively and as a second input to complex multiplier 35. A first summing circuit 34 is coupled to receive the outputs from 32 and 33 and provide a summed output to the dividers 36 and 37 which are also coupled to receive individual outputs from the complex multiplier 35. As constructed, each of the circuits is a conventional digital device with the delays 30 and 31 (e.g. shift registers) providing a time delay equal to the time interval between the reception of successive radar returns. When connected as shown, the devices form a circuit which digitally implements the multiplication and addition of equations 11 and 12 to provide the phase signals $R_I$ and $R_Q$ at the output of dividers 36 and 37, respectively.

The digital inputs $S_I$ and $S_Q$ are additionally provided to a means for combining the phase and amplitude components consisting of real multipliers 38,39, summing circuits 40,41, complex multiplier 42, and shift register delays 43,44. Specifically digital outputs $S_I$ and $S_Q$ are provided to real multipliers 38 and 39 respectively where they are multiplied by the real coefficients $A_n$ as developed in the conventional manner by a means for providing an amplitude component. The outputs from the multipliers 38 and 39 are then coupled as one input to summing circuits 40 and 41, respectively, whose outputs are in turn coupled to complex multiplier 42 where they are multiplied with the complex conjugate parts of the filter coefficient $R_I$ and $R_Q$. The complex filter coefficient is converted to its complex conjugate either before entering or in multiplier 42 in a conventional manner. The I and Q outputs from 42 are then coupled to shift register delays 43 and 44, respectively, which have a number of shift positions equal to the number of radar range resolution cells and provide a total delay equal to the delays 30 or 31. The outputs from 43 and 44 are then coupled back to summing circuits 40 and 41, respectively, where they are summed with the input from multipliers 38 and 39. The summed outputs from 40 and 41 are then taken as the $S_I$ and $S_Q$ radar return inputs to the next filter stage 20′ of identical construction as shown in FIG. 1.

The operation of the filter circuits and system can now easily be understood with reference to FIG. 2. As was pointed out, the phase part (R) of the complex coefficient is detected by the circuits 30–37 and combined with the real part of the complex coefficient ($A_n$) in complex multiplier 42 to provide the complete filter coefficient necessary to fix the notch frequency at a specific mean-clutter-doppler and cancel a particular type clutter. In contrast to prior known systems the present invention uses the shift registers 43 and 44 to provide sequential summation, two at a time, so that multipliers and shift registers can be time shared and not require the multiple delay circuits of conventional systems. In operation, the first radar return has each of its range cell values multiplied in 42 and stored in shift registers 43 and 44 until the next radar return appears. Each new range cell value from 38 and 39 is then added to the previously multiplied range cell value as stored in 43 and 44 and again multiplied in 42 before being stored in 43 and 44. The sum of the first and second multiplied returns is then added to the third return and so forth to cancel the clutter at the $S_I$ and $S_Q$ outputs from 20. If for example, a three pulse canceller is desired, the summing circuits 40 and 41 provide outputs $S_I$ and $S_Q$ after the third pulse is added to the sum of the first and second pulses. All circuits are then reset and the same operation repeated for each three pulse series.

Using the above filter techniques, the system is capable of cancelling two types of clutter occurring simultaneously in the radar return. By way of example, if the clutter consisted of ground and weather clutter, two filters 20,21' would be cascaded as shown by FIG. 1 to form a two stage MTI filter system. The ground clutter as previously noted has a strong amplitude and very narrow doppler spectrum while the weather clutter has a weak amplitude but broad doppler spectrum. At the first stage, therefore, since the ground clutter is much stronger than the weather clutter, the ground clutter mean doppler would be detected and a notch placed at that point to cancel the ground clutter from the radar returns. The weather clutter, however, would pass to the second stage where the mean-clutter-doppler of the weather clutter would be detected in the same manner as the first stage, to place a notch at the weather clutter mean doppler and cancel that clutter from the radar return. The signals from the second stage will then be free of both ground and weather clutter and will be passed to detector 21 to sense the presence or absence of a target in the conventional manner. Thus, two types of clutter simultaneously present in the radar returns may be cancelled in digital fashion to allow improved MTI operation.

As presently described, the value of the phase coefficient R is updated at every range bin, with the value of R measured at the previous range cell return being applied as the phase coefficient for a subsequent range cell return. While such operation is straight forward and simple, a danger exists in mistaking a target return as a clutter return and in inaccurate means values due to statistical variation of the clutter samples. It is therefore considered that a more reliable technique to update the value of R would be to utilize an average value of the returns from a large number of range bins. This could be accomplished with conventional techniques to provide an average value of $S_I$ and $S_Q$ as inputs to the circuits 30 and 31 as opposed to pulse to pulse changes.

As can be seen from the above description, the present invention provides a digital mean-clutter-doppler compensation system which can place an MTI filter notch at the velocity where clutter is concentrated. When used in conjunction with a multi-stage MTI system, the filter notch of each stage can be adjusted separately. By a proper selection of the real part of the coefficient ($A_n$) therefore, and the inclusion of the detection and compensation circuit to provide the complx coefficients (R), each stage can be designed to handle the cancellation of a particular type clutter with independent adjustment of the notch position as the mean-clutter-doppler varies. In addition, by using the unique shift-register summing-circuit, multiple delay circuits are unnecessary thereby reducing the complexity and cost of a digital system. All of these are advantages not found in the prior art as is previously mentioned.

It should be further noted that while specific methods of updating the R coefficients were mentioned, other methods related to the particular requirements of the radar system could also be employed. For example, the updating could be tied to the constant false alarm rate (CFAR) logic so that whenever target detections are made in two or more consecutive range bins, the present measured R and the R in use, could be compared, and after a large number of samples a decision made to either change R or raise the threshold for all stages under consideration.

Obviously many other modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A digital moving target indicator filter comprising:
    inputs means for receiving a source of radar pulse returns in digital form;
    detection means coupled to said input means for detecting a complex phase component of the radar returns as a function of the mean-clutter-doppler frequency of a particular type clutter;
    means for providing an amplitude component selected to minimize clutter at the particular mean-clutter-doppler frequency; and
    means for combining the conjugate of the complex phase component and the amplitude component to produce a weighting coefficient and cancel clutter from said radar returns at the detected mean-clutter-doppler frequency.

2. The filter of claim 1 wherein said input means includes:
    means for receiving an in-phase digital signal, and means for receiving a quadrature-phase digital signal, and further wherein said detection means comprises;
    first delay means coupled to receive said in-phase signals and provide a delayed in-phase output,
    second delay means coupled to receive said quadrature-phase signals and provide a delayed quadrature-phase output,
    squaring means coupled to said first and second delay means outputs for providing in-phase and quadrature-phase squared outputs of said delayed in-phase and quadrature-phase signals,
    first summing means coupled to add said in-phase and quadrature-phase squared outputs and provide a summed output,
    first complex multiplier means coupled to multiply the in-phase and quadrature-phase signals from said input means and delay means to provide first in-phase and second quadrature-phase outputs, and
    divider means coupled to divide said first in-phase and second quadrature-phase outputs by said summed output to provide in-phase and quadrature-phase signals representing said phase component.

3. The filter of claim 2 wherein said means for combining comprises;
    first real multiplier means coupled to said input means and said amplitude component providing means for multiplying each in-phase signal with an amplitude component and providing an in-phase output,
    second real multiplier means coupled to said input means and said amplitude component providing means for multiplying each quadrature-phase signal with an amplitude component and providing a quadrature-phase output,
    second summing means coupled to sum said first real multiplier output with a second in-phase input and provide a summed in-phase output, third summing means coupled to sum said second real multiplier output with a second quadrature-phase input and provide a summed quadrature-phase output, second complx multiplier means coupled to multiply the in-phase and quadrature-phase divider means outputs with said second and third summing means outputs to provide in-phase and quadrature-phase outputs, third delay means coupled to receive said in-phase output from said second complex multiplier and provide a delayed signal as said second in-phase input to said second summing means, fourth delay means coupled to receive said quadrature-phase output from said second complex multiplier and provide a delayed signal as said second quadrature-phase input to said third summing means.

4. The filter of claim 3 wherein each of said delay means is a shift register having a number of shift positions equal to the number of range resolution cells.

5. In a moving target indicating radar having a filter system for suppressing clutter returns, an improved filter system for suppressing a plurality of clutter types occurring simultaneously in the radar returns comprising:

first digital filter means for detecting a first clutter type from the radar returns and providing a notch at the mean-clutter-doppler frequency of said first clutter type to provide filtered radar returns; and at least one second digital filter means, coupled to receive the filtered radar returns from said first digital filter means, for detecting a different clutter type from said filtered radar returns and providing a notch at the mean-clutter-doppler frequency of said different clutter type to further filter said radar returns.

6. The system of claim 5 wherein said first and second digital filters each comprise:

input means for receiving a source of radar pulse returns in digital form;

detection means coupled to said input means for detecting a phase component of the radar returns as a function of the mean-clutter-doppler frequency of a particular type clutter;

means for providing an amplitude component selected to minimize clutter at the particular mean-clutter-doppler frequency; and means for combining the conjugate of the complex phase component and amplitude component to produce a weighting coefficient and cancel clutter from said radar returns.

7. The system of claim 6 wherein said input means includes;

means for receiving an in-phase digital signal, and means for receiving a quadrature-phase digital signal, and further wherein said detection means comprises;

first delay means coupled to receive said in-phase signals and provide a delayed in-phase output, second delay means coupled to receive said quadrature-phase signals and provide a delayed quadrature-phase output, squaring means coupled to said first and second delay means outputs for providing in-phase and quadrature-phase squared outputs of said delayed in-phase and quadrature-phase signals, first summing means coupled to add said in-phase and quadrature-phase squared outputs and provide a summed output, first complex multiplier means coupled to multiply the in-phase and quadrature-phase signals from said input means and delay means to provide first in-phase and second quadrature-phase outputs, and divider means coupled to divide said first in-phase and second quadrature-phase outputs by said summed output to provide in-phase and quadrature-phase signals representing said phase component.

8. The system of claim 7 wherein said means for combining comprises;

first real multiplier means coupled to said input means and said amplitude component providing means for multiplying each in-phase signal with an amplitude component and providing an in-phase output, second real multiplier means coupled to said input means and said amplitude component providing means for multiplying each quadrature-phase signal with an amplitude component and providing a quadrature-phase output, second summing means coupled to sum said first real multiplier output with a second in-phase input and provide a summed in-phase output, third summing means coupled to sum said second real multiplier output with a second quadrature-phase input and provide a summed quadrature-phase output, second complex multiplier means coupled to multiply the in-phase and quadrature-phase divider means outputs with said second and third summing means outputs to provide in-phase and quadrature-phase outputs, third delay means coupled to receive said in-phase output from said second complex multiplier and provide a delayed signal as said second in-phase input to said second summing means, fourth delay means coupled to receive said quadrature-phase output from said second complex multiplier and provide a delayed signal as said second quadrature-phase input to said third summing means.

9. The system of claim 8 wherein each of said delay means is a shift register having a number of shift positions equal to the number of range resolution cells.

10. The system of claim 9 wherein the outputs of the first and second summing circuits of said first digital filter means are coupled to provide the in-phase and quadrature phase signals to the input means of said second digital filter means.

* * * * *